Patented Feb. 26, 1924.

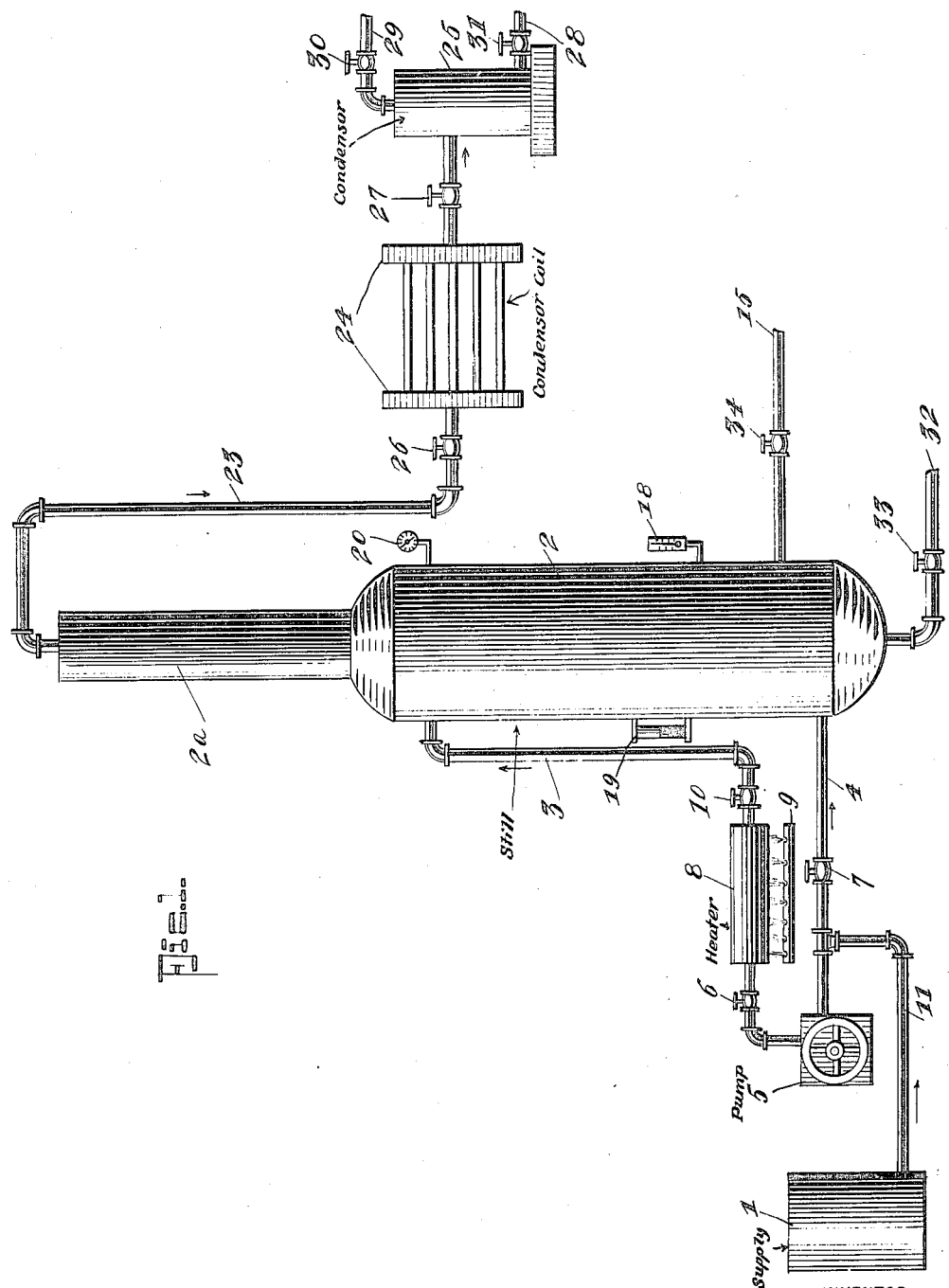

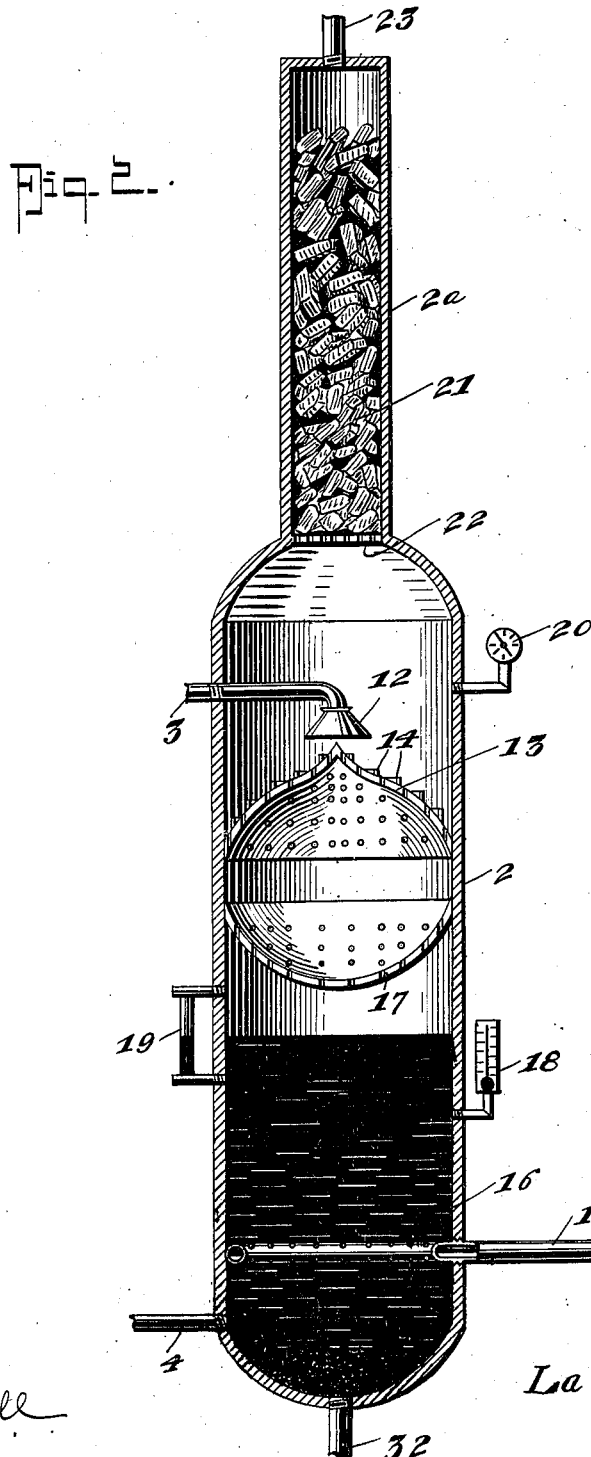

1,484,922

UNITED STATES PATENT OFFICE.

LA VAN WARREN, OF OKMULGEE, OKLAHOMA.

METHOD OF RECOVERING GASOLINE.

Application filed October 6, 1919. Serial No. 328,790.

*To all whom it may concern:*

Be it known that I, LA VAN WARREN, a citizen of the United States, and a resident of Okmulgee, in the county of Okmulgee and State of Oklahoma, have invented certain new and useful Improvements in Methods of Recovering Gasoline, of which the following is a specification.

My invention is an improvement in methods and apparatus of gasoline recovery, and has for its object to provide a process and apparatus of the character specified for recovering a maximum of high grade fuel from natural gas, crude oil and the like, wherein the gas and the oil are combined to increase the amount of hydrocarbon products derived from the oil and the gas.

In the drawings:

Figure 1 is a front view of the apparatus;

Figure 2 is a vertical section through the still.

In the present embodiment of the invention an oil supply tank 1 is provided from which may be fed crude oil, distillate, fuel oil, low grade gasoline or the like, or they may be all mixed together, as they will be separated during the process.

A still 2 is provided, to be later described in detail, and this still is connected by pipe lines 3 and 4 with a pump 5 of any preferred form. Valves 6 and 7 are interposed in these pipe lines between the pump and the still, and in the pipe line 3 a heater is interposed, the said heater consisting of a casing 8 through which the oil is passed, and a burner 9 of any suitable construction, in the present instance a gas burner. Another valve 10 is interposed in the line 3 between the heater and the still, and a branch line 11 leads from the pipe 4 to the tank 1, between the valve 7 and the pump.

The still has a casing having a reduced top portion 2ª, and having its ends rounded as shown. The pipe line 4 opens near the bottom of the still and the pipe line 3 near the top of the main portion. This pipe line 3 extends to approximately the center of the portion 2, and then downwardly, and is provided with a spray 12 for delivering the oil in a spray. A screen 13 of arched formation is arranged below the spray, the said screen in the present instance being formed of sheet metal having perforations and baffle vanes 14 are arranged on the upper surface of the screen, to slow the movement of the oil down the screen.

The field gas line 15 opens into the portion 2 of the still near the bottom, and delivers through the oil in the still by means of a vaporizer 16. This vaporizer is a circular tube having outlet openings for the gas, and it will be evident that the gas from the field line will bubble up through the oil in the still and will pass through a screen 17 which is arranged between the screen 13 and the vaporizer 16. This screen 17 is of segmental form, being composed of sheet metal having perforations, and the concave side of this screen is oppositely arranged to that of the screen 13, the concave sides of the screens being adjacent.

The gas which passes up through the oil in the bottom of the still will be broken up by the screen 17 and will be thoroughly mixed with the oil passing down through the screen 13. A thermometer 18 is connected with the portion 2 of the still below the oil level, and a sight gage 19 is provided for indicating the level of the oil in the still. A pressure gage 20 is connected with the still near the inlet pipe 3, and the portion 2ª of the still casing, which is a stack, is partially filled with cobble stones indicated at 21, a perforated partition 22 being arranged between the stack and the body of the still to support the cobble stones.

From the stack a pipe line 23 leads to condensing coils 24 and from the coils to a condenser 25. Valves 26 and 27 are interposed in this line on opposite sides of the coils 24, and the condenser has an outlet pipe 28 for the gasoline, and an outlet pipe 29 for the residue gas, valves 30 and 31 being interposed in the respective pipes. A drain pipe 32 is provided for the still, the said pipe being at the bottom of the still and having a valve 33 for controlling the same. A valve 34 is interposed in the field gas pipe line for controlling said line.

I claim:

The method of recovering gasoline consisting of collecting a pool of heated oil in a closed container, introducing field gas into the pool of oil to pass through into the condenser space above the oil, spraying heated oil into said space to meet the gas, retarding the upward passage of the gas and the downward passage of the oil throughout the entire transverse area of the container so as to subject all parts of both elements to retardation and conducting the gas into a condenser.

LA VAN WARREN.